Nov. 6, 1962

F. CZAPAR 3,061,856

FAT AND BONE DUST REMOVER

Filed Feb. 28, 1961

INVENTOR.
FRANK CZAPAR

BY Knox & Knox

United States Patent Office 3,061,856
Patented Nov. 6, 1962

3,061,856
FAT AND BONE DUST REMOVER
Frank Czapar, 4217 Swift Ave., San Diego 4, Calif.
Filed Feb. 28, 1961, Ser. No. 92,418
3 Claims. (Cl. 15—3.1)

This invention relates to apparatus for removing fat and bone dust from meats that have been cut with a saw.

When a butcher prepares various cuts of meat that have a common bone running therethrough, it becomes necessary to saw through the bone at various places. When this is done, particularly with a powered band saw, bone dust and fat are packed onto the surface of the cut meat. These coat the surface of the meat with a layer that should be removed for aesthetic and other reasons.

Prior Art

In the past, this layer was sometimes wiped off by hand, with a cloth, or with the edge of a knife. Neither of these methods was completely satisfactory. Power devices to achieve a better result were introduced, and these took several forms. One form used an endless belt, and the meat was pressed against it. Another form used a rotating brush positioned under a flat grille, and the meat was passed over the grille.

As may be realized these devices required quite a bit of room. Furthermore, all these devices were difficult to clean, since they had to be completely disassembled. Failure to periodically and thoroughly clean these devices introduced a hygienic problem.

Objects

It is therefore the principal object of my invention to provide an improved fat and bone dust remover.

It is another object of my invention to provide an improved portable fat and bone dust remover that can be easily cleaned.

It is a further object of my invention to provide an improved fat and bone dust remover that can be cleaned without disassembling the entire device.

It is still another object of my invention to provide an improved fat and bone dust remover that can safely be cleaned while it is still being energized. In other words, the brush may be rotated under power while the cleaning of the tool is effected.

It is a still further object of my invention to provide an improved fat and bone dust remover that positively assures satisfactory removal of the fat and bone dust layer.

Figure 1:
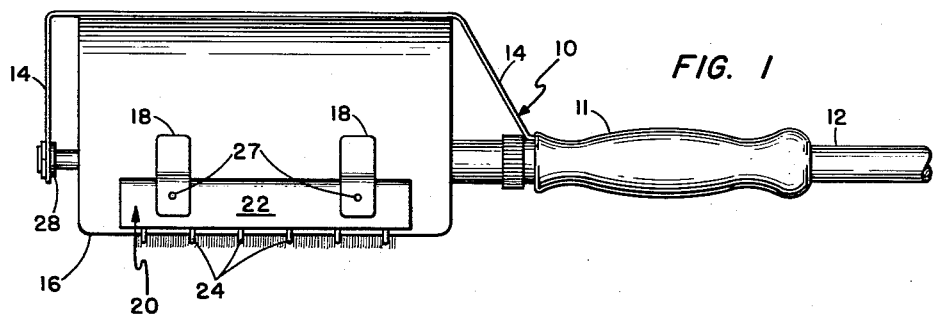
Figure 2:
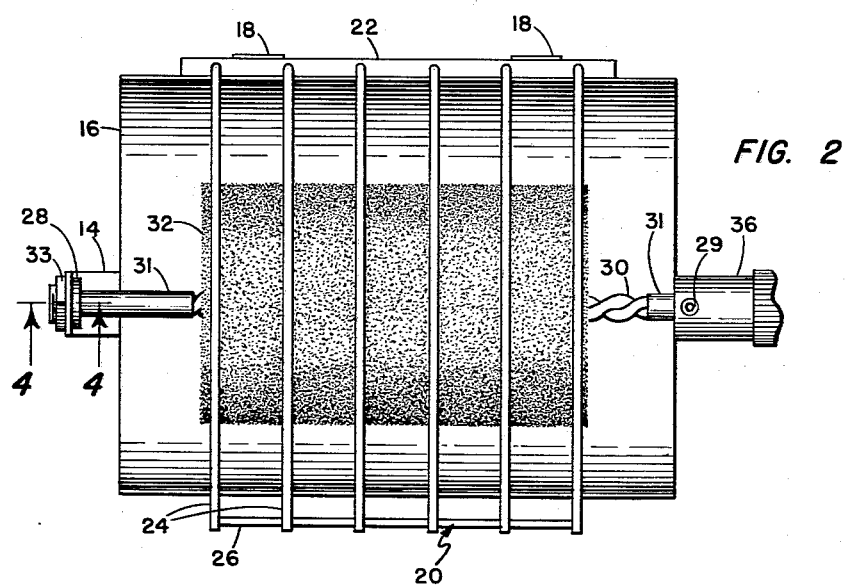
Figure 3:
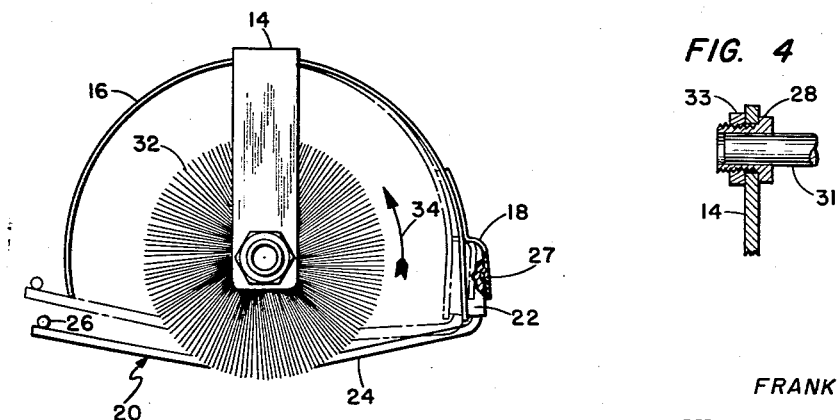
Figure 4:
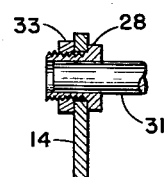

The attainment of these objects and others will be realized from the following specification, taken in conjunction with the drawings, of which:

FIGURE 1 is a side view of my invention;
FIGURE 2 is a bottom view of my invention;
FIGURE 3 is an end view of my invention; and
FIGURE 4 is a cross sectional view that illustrates the brush support and bearing structure.

Broadly speaking, my invention contemplates a power-rotated brush partially surrounded by a dust-catching hood. An easily removable pressure grille assures that only the ends of the brush bristles protrude beyond the grille, so that the bristles cannot be folded back, nor can they dig too deeply into the meat. The pressure grille snaps on and off the hood to permit cleaning of the underside of the hood.

The Invention

In FIGURE 1, head 10 comprises a hollow handle 11 that is traversed by a flexible power shaft 12, which may be enclosed in a protective sheath in a well known manner. The distal end of flexible shaft 12 is driven by an electric motor (not shown), which may be positioned under the work table, so that it will be out of the way.

The proximal end of handle 11 has a generally U-shaped supporting bracket 14 affixed thereto. Attached to the central portion of bracket 14 is a hood 16, semi-cylindrical in transverse cross-section, and having a holding means such as spring strap clips 18. These holding clips 18 grasp and retain a cross bar or base 22 of a pressure grille, generally indicated by the numeral 20, this grille also including fingers 24 in parallel, spaced relation, normal of the base 22, and a reinforcing bar 26. Clips 18 have dimples 27 that engage detents in base 22. The proximal end of bracket 14 has a bearing 28, whose function will be best understood from FIGURE 2.

In FIGURE 2, it will be seen that a rotatable cylindrical brush 32 comprises a twisted-wire axle 30 that terminates in sleeves 31. The termination of flexible cable 12 comprises a socket 36 having a set screw 29. One sleeve 31 fits into the socket, and is held by the set screw 29.

The sleeve 31 at the other end of axle 30 is supported by bearing 28, which is held to bracket 14 by a nut 33. This arrangement is more clearly shown in the cross sectional view of FIGURE 4.

The bristles that form brush 32 are fastened to the twists of the axle wires 30. As shown in FIGURE 3 the fingers 24 of grille 20 are curved so that they are normally just even with the ends of the bristles. This arrangement is important, as it protects the bristles from inadvertent damage during non-use periods.

Brush 32 may be of any suitable form, a helical arrangement of the bristles having proved quite satisfactory.

Operation

In use, my invention operates as follows: The motor is energized by a suitable switch and source of power; the motor being suspended beneath the work table as previously explained. The meat to be cleaned is placed on the work table, and the flexible shaft permits the head 10 to be brought up to the meat. The head is positioned above the meat, with pressure grille 20 in contact therewith. As the brush 32 rotates in the direction of arrow 34, the tips of the brush bristles engage the surface of the meat, and brush the fat and bone dust from its surface. These particles are thrown by centrifugal force onto the inner surface of hood 16; most of the particles lodging on the inner surface adjacent holding clips 18.

I have found that if the bristles that form the brush protrude too far beyond fingers 24, while in use, they tend to bend. This bending permits the bristle's sides to slide over the meat, rather than removing the layer of fat and bone dust.

I prevent the condition as follows: If the head should be pressed too hard against the surface to be cleaned, pressure grille 20 moves to the broken line position shown in FIGURE 3. Here it is stopped by butting against the edge of hood 16. In the illustrated embodiment, fingers 24 are made of fairly rigid stainless steel wires, and hood 16 is slightly resilient to permit the desired limited movement. This arrangement permits the operator to control the pressure on the meat and pressure can be increased slightly as the bristles wear away due to usage.

Periodically it is desirable to remove the fat and bone dust that have accumulated on the inner surface of hood 16. To clean hood 16, pressure grille 20 is removed by sliding base 22 out of holding clips 18. With grille 20 thus removed, the edges of the inner surface of hood 16 are easily accessible for cleaning. These areas may have the deposited fat and bone dust particles removed by wiping the areas with a cloth, the fingers, or in any other suitable manner. There is sufficient clearance between brush 32 and the inner surface of hood 16 so that the inner surfaces can be wiped clean even while the brush is rotating.

When it becomes desirable to remove brush 32 for thoroughly cleaning it or the entire inner surface of hood 16, brush 32 is easily removed as follows:

The ends of bracket 14 are spread apart slightly. It will be seen from FIGURE 4 that as bracket 14 and the attached bearing 28 is moved to the left, sleeve 31 of the brush will slide out of the bearing.

Set screw 29 is then loosened, and the other end of axle 30 may be removed from the end of the flexible shaft. In this way the entire head may be easily dissembled whenever necessary.

*Advantages*

It will be realized that my invention requires very little room, and in fact may be easily kept under the work table. In use, only the head portion is brought to the work area. The pressure grille assures optimum operation by assuring that only the bristle tips touch the surface to be cleaned, and by preventing the bristles from bending. Moreover, my apparatus may be easily cleaned, even while it is energized. When a thorough cleaning is necessary, complete disassembly is readily accomplished.

It is understood that minor variation from the form of of the invention disclosed herein may be made without departure from the spirit and scope of the invention, and that the specification and drawing are to be considered as merely illustrative rather than limiting.

I claim:

1. Apparatus for removing the layer of fat and bone dust from a piece of meat, comprising:
   a handle having a bore therethrough;
   a flexible shaft positioned to traverse said bore;
   a rotatable brush having an axle;
   means for fastening one end of said axle to said flexible shaft;
   a semi-cylindrical, open-ended hood;
   bracket means secured to said handle to support said hood and the other end of said axle so that the brush is supported substantially concentric of said hood;
   a pressure grille comprising a base and fairly rigid fingers attached to said base;
   means for attaching said base of said pressure grille to said hood so that the periphery of said brush it normally even with said fingers in one position, said hood being resilient, thus enabling said pressure grille as a whole to be pressed into a second position with said brush projecting beyond said fingers in a second position when said fingers are pressed against the surface of the meat.

2. Apparatus for removing the layer of fat and bone dust from a piece of meat, comprising:
   an elongated handle having a bore therethrough;
   a bracket having one end thereof affixed to said handle;
   a flexible shaft positioned to traverse said bore of said handle;
   a rotatable brush having its axle affixed to the end of said flexible shaft and having the end thereof distal from said handle journaled in said bracket;
   a resilient hood affixed to said bracket, and positioned to partly enclose said brush; and
   a pressure grille comprising a plurality of fairly rigid curved fingers readily, detachably affixed to said resilient hood, the resiliency of said head permitting said pressure grille to be shiftable as a whole to expose a segment of the periphery of said brush.

3. Apparatus for removing the layer of fat and bone dust from a piece of meat, comprising:
   a hollow elongated handle;
   a U-shaped bracket having one end thereof applied to one end of said handle;
   a bearing affixed to the other end of said bracket in general alignment with the axis of said handle;
   a resilient semi-cylindrical hood affixed to the central portion of said bracket, whereby said hood and said handle are generally coaxial;
   a pair of holding clips affixed to said hood adjacent one longitudinal edge thereof;
   a flexible driving shaft positioned to traverse said hollow handle;
   a source of rotational power attached to the distal end of said flexible shaft;
   a cylindrical brush having a twisted-wire axle, and having a plurality of bristles affixed to said twisted-wire axle;
   a sleeve affixed to each end of said twisted-wire axle;
   means for affixing one of said sleeves to the proximal end of said flexible shaft;
   means for positioning said other sleeve in said bearing, whereby said brush is generally concentrically positioned within said hood;
   a pressure grille comprising a base, a plurality of fixedly spaced-apart curved fingers affixed to said base, and a reinforcing bar affixed to the ends of said fingers;
   means for positioning said fingers so that they are normally substantially even with the tips of the bristles of said brush but under pressure the resilient hood is yieldable to expose the tips of said bristles beyond said curved fingers, said positioning means comprising means for causing said holding clips to hold the base of said pressure grille.

References Cited in the file of this patent

UNITED STATES PATENTS

| | | |
|---|---|---|
| 431,497 | Walker | July 1, 1890 |
| 985,521 | Fromm | Feb. 18, 1911 |
| 1,374,181 | Bohlman | Apr. 12, 1921 |
| 1,473,431 | Holstein | Nov. 6, 1923 |
| 2,400,723 | Vrana | May 21, 1946 |
| 2,959,797 | Harman | Nov. 15, 1960 |